US011609465B2

(12) United States Patent
Chen

(10) Patent No.: US 11,609,465 B2
(45) Date of Patent: Mar. 21, 2023

(54) DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Shujhih Chen, Shenzhen (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 529 days.

(21) Appl. No.: 16/623,409

(22) PCT Filed: Nov. 8, 2019

(86) PCT No.: PCT/CN2019/116767
§ 371 (c)(1),
(2) Date: Dec. 17, 2019

(87) PCT Pub. No.: WO2021/047005
PCT Pub. Date: Mar. 18, 2021

(65) Prior Publication Data
US 2021/0405481 A1 Dec. 30, 2021

(30) Foreign Application Priority Data

Sep. 10, 2019 (CN) .......................... 201910851925.X

(51) Int. Cl.
G02F 1/1362 (2006.01)
G02F 1/1368 (2006.01)

(52) U.S. Cl.
CPC ...... *G02F 1/136286* (2013.01); *G02F 1/1368* (2013.01); *G02F 1/136222* (2021.01)

(58) Field of Classification Search
CPC ......... G02F 1/136286; G02F 1/136222; G02F 1/1368
See application file for complete search history.

(56) References Cited

U.S. PATENT DOCUMENTS

2007/0091045 A1* 4/2007 Hisatake .............. G09G 3/3607
345/88
2008/0030633 A1* 2/2008 Tsai .................... G02F 1/13338
349/12
2008/0122804 A1 5/2008 Kinoshita
(Continued)

FOREIGN PATENT DOCUMENTS

CN 101191968 A 6/2008
CN 202049315 A 11/2011
(Continued)

*Primary Examiner* — Lucy P Chien
(74) *Attorney, Agent, or Firm* — PV IP PC; Wei Te Chung; Ude Lu

(57) ABSTRACT

Embodiments of the present disclosure provide a display panel comprising an array substrate, wherein the array substrate comprises a common electrode with a low-level voltage, pixel circuit units and photosensitive transistors. The pixel circuit units are electrically connected to gate lines, data lines and the common electrode. And the photosensitive transistors are electrically connected with the pixel circuit units and the common electrode.

16 Claims, 1 Drawing Sheet

(56) References Cited

U.S. PATENT DOCUMENTS

| | | | |
|---|---|---|---|
| 2013/0107095 A1 | 5/2013 | Yarino et al. | |
| 2015/0070549 A1 | 3/2015 | Yarino et al. | |
| 2015/0145833 A1 | 5/2015 | Yamazaki | |
| 2015/0325194 A1* | 11/2015 | Um | G02F 1/1368 345/89 |
| 2017/0213850 A1 | 7/2017 | Dong et al. | |

FOREIGN PATENT DOCUMENTS

| | | |
|---|---|---|
| CN | 102338946 A | 2/2012 |
| CN | 104464448 A | 3/2015 |
| CN | 104932137 A | 9/2015 |
| CN | 107479281 A | 12/2017 |
| WO | 2012005011 A1 | 1/2012 |

\* cited by examiner

DISPLAY PANEL AND DISPLAY DEVICE

TECHNICAL FIELD

The present disclosure relates to the field of display, and in particular to a display panel and a display device.

BACKGROUND

In the prior art, when a liquid crystal display is used for projection display, a laser pointer cannot be used for projection. It is inconvenient for a narrator to point the laser pointer at the projection screen when narrating through a screen.

SUMMARY

Embodiments of the present disclosure provide a display panel and a display device, to solve a technical problem that the laser pointer cannot project when it projects to display with the liquid crystal display.

An embodiment of the present disclosure provides a display panel comprising an array substrate and a color filter substrate, wherein the array substrate comprises a plurality of gate lines and a plurality of data lines, the color filter substrate comprises a plurality of color resists, and the array substrate further comprises a common electrode; a plurality of pixel circuit units, electrically connected with the plurality of gate lines, the plurality of data lines, and the common electrode; and a plurality of photosensitive transistors, electrically connected with the plurality of pixel circuit units, and the common electrode; wherein a voltage of each of the pixel circuit units is pulled down to a voltage of the common electrode, when each of the photosensitive transistors is turned on by receiving external light.

In a display panel provided in an embodiment of the present disclosure, each of the pixel circuit units comprises a thin film transistor, a capacitor, a pixel electrode, and a node; wherein a gate of the thin film transistor is connected with the gate line, a source of the thin film transistor is connected with the node, and a drain of the thin film transistor is connected with the data line; wherein one end of the capacitor is connected with the node, and the other end of the capacitor is connected with the common electrode; and wherein the pixel electrode is connected with the node.

In a display panel provided in an embodiment of the present disclosure, a gate and a source of the photosensitive transistor are connected with the common electrode, and a drain of the photosensitive transistor is connected with the node.

In a display panel provided in an embodiment of the present disclosure, the pixel electrodes comprise red pixel electrodes, green pixel electrodes, and blue pixel electrodes corresponding to red resists, green resists, and blue resists respectively; wherein the photosensitive transistors are connected with any one of groups of the red pixel electrodes, the green pixel electrodes, and the blue pixel electrodes; or wherein the photosensitive transistors are connected with any two of groups of the red pixel electrodes, the green pixel electrodes, and the blue pixel electrodes respectively.

In a display panel provided in an embodiment of the present disclosure, the photosensitive transistor is an indium gallium zinc oxide transistor or a silicon transistor.

An embodiment of the present disclosure provides a display panel comprising an array substrate, wherein the array substrate comprises a plurality of gate lines and a plurality of data lines, and the array substrate further comprises a common electrode; a plurality of pixel circuit units, electrically connected with the plurality of gate lines, the plurality of data lines, and the common electrode; and a plurality of photosensitive transistors, electrically connected with the plurality of pixel circuit units, and the common electrode; wherein a voltage of each of the pixel circuit units is pulled down to a voltage of the common electrode, when each of the photosensitive transistors is turned on by receiving external light.

In a display panel provided in an embodiment of the present disclosure, each of the pixel circuit units comprises a thin film transistor, a capacitor, a pixel electrode, and a node; wherein a gate of the thin film transistor is connected with the gate line, a source of the thin film transistor is connected with the node, and a drain of the thin film transistor is connected with the data line; wherein one end of the capacitor is connected with the node, and the other end of the capacitor is connected with the common electrode; and wherein the pixel electrode is connected with the node.

In a display panel provided in an embodiment of the present disclosure, a gate and a source of the photosensitive transistor are connected with the common electrode, and a drain of the photosensitive transistor is connected with the node.

In a display panel provided in an embodiment of the present disclosure, the pixel electrodes comprise red pixel electrodes, green pixel electrodes, and blue pixel electrodes corresponding to red resists, green resists, and blue resists respectively; wherein the photosensitive transistors are connected with any one of groups of the red pixel electrodes, the green pixel electrodes, and the blue pixel electrodes; or wherein the photosensitive transistors are connected with any two of groups of the red pixel electrodes, the green pixel electrodes, and the blue pixel electrodes respectively.

In a display panel provided in an embodiment of the present disclosure, the photosensitive transistor is an indium gallium zinc oxide transistor or a silicon transistor.

An embodiment of the present disclosure provides a display device comprising a display panel, wherein the display panel comprises an array substrate, the array substrate comprises a plurality of gate lines and a plurality of data lines, and the array substrate further comprises a common electrode; a plurality of pixel circuit units, electrically connected with the plurality of gate lines, the plurality of data lines, and the common electrode; and a plurality of photosensitive transistors, electrically connected with the plurality of pixel circuit units, and the common electrode; wherein a voltage of each of the pixel circuit units is pulled down to a voltage of the common electrode, when each of the photosensitive transistors is turned on by receiving external light.

In a display device provided in an embodiment of the present disclosure, each of the pixel circuit units comprises a thin film transistor, a capacitor, a pixel electrode, and a node; wherein a gate of the thin film transistor is connected with the gate line, a source of the thin film transistor is connected with the node, and a drain of the thin film transistor is connected with the data line; wherein one end of the capacitor is connected with the node, and the other end of the capacitor is connected with the common electrode; and wherein the pixel electrode is connected with the node.

In a display device provided in an embodiment of the present disclosure, the pixel electrodes comprise red pixel electrodes, green pixel electrodes, and blue pixel electrodes corresponding to red resists, green resists, and blue resists respectively; wherein the photosensitive transistors are connected with any one of groups of the red pixel electrodes, the green pixel electrodes, and the blue pixel electrodes; or wherein the photosensitive transistors are connected with any two of groups of the red pixel electrodes, the green pixel electrodes, and the blue pixel electrodes respectively.

In a display device provided in an embodiment of the present disclosure, the photosensitive transistor is an indium gallium zinc oxide transistor or a silicon transistor.

In contrast with the display panel in the prior art, in the display panel and the display device provided in the embodiments of the present disclosure, each of the photosensitive transistor is connected with the pixel circuit unit. When the photosensitive transistor does not absorb external light, the photosensitive transistor is off and the voltage applied to the vertically aligned (VA) liquid crystal is normal, at this time the display picture is normal; when a user irradiates the display panel provided in the embodiments by using the laser pointer, in an area irradiated by the laser pointer, the photosensitive transistor absorbs external light and turns on, the voltage of the pixel circuit unit is pulled down to the low-level voltage of the common electrode and there is no voltage differential applied to the VA liquid crystal, thus the liquid crystal does not deflect, the light cannot pass through the liquid crystal, and the picture corresponding to the pixel circuit unit is black, while it displays normal color with the pixel circuit unit not connected with the photosensitive transistor in the area irradiated by the laser pointer, thus allowing displaying non-white color in the area irradiated by the laser pointer and projecting. Thus the technical problem that a laser pointer cannot project when it projects to display with a liquid crystal display at present is solved.

BRIEF DESCRIPTION OF DRAWINGS

In order to clearly illustrate the technical solutions in embodiments of the present disclosure, the accompanying drawings, which will be necessarily used in the description of the embodiments, will be explained. It is apparent for those skills in the art that the figures described below, from which some other figures can also be derived without any creative practice, are merely some embodiments of the present disclosure.

DETAILED DESCRIPTION OF PREFERRED EMBODIMENTS

Referring to the accompanying drawings, wherein, same reference numbers represent same elements. The description described below are based on the embodiments of the present disclosure, and should not be considered as a limitation to other specific embodiments of the present disclosure that are not described herein in detail.

Figure 1:
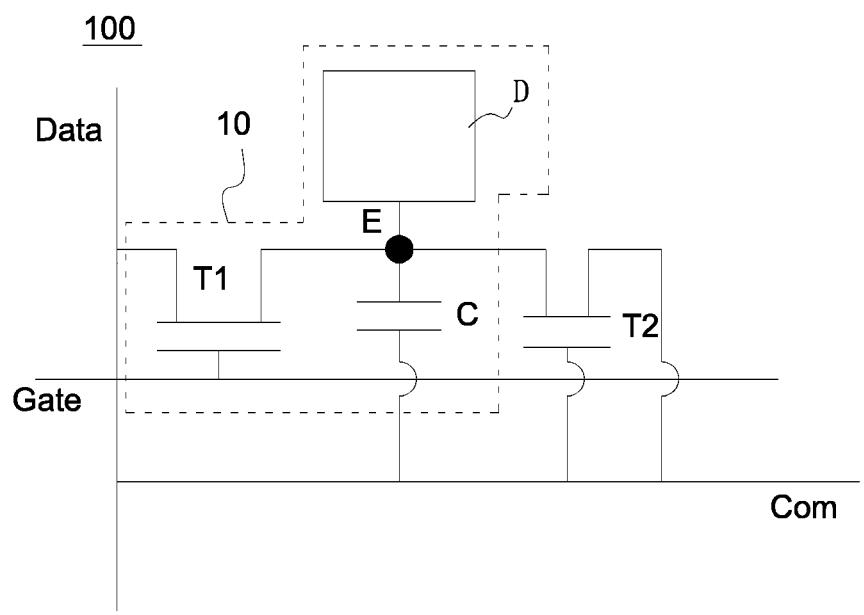
FIG. 1 is a schematic structure diagram of a part of circuits of an array substrate of a display panel according to an embodiment of the present disclosure.

Please refer to FIG. 1, which is a schematic structure diagram of a part of circuits of an array substrate of a display panel according to an embodiment of the present disclosure. FIG. 1 only illustrates a connection structure of one pixel circuit unit 10 connected to a photosensitive transistor T2, which is not a limitation to the embodiment of the present disclosure hereto.

A display panel 100 according to the embodiment of the present disclosure comprises an array substrate. The array substrate comprises a plurality of gate lines Gate, a plurality of data lines Data, a common electrode Com, a plurality of pixel circuit units 10, and a plurality of photosensitive transistors T2.

The plurality of pixel circuit units 10 are electrically connected to the plurality of gate lines Gate, the plurality of data lines Data, and the common electrode Com. The plurality of photosensitive transistors T2 are electrically connected to the plurality of pixel circuit units 10 and the common electrode Com, wherein a voltage of each of the pixel circuit units 10 is pulled down to a voltage of the common electrode Com, when each of the photosensitive transistors T2 is turned on by receiving external light.

It should be noted that, the display panel 100 according to the embodiment comprises the array substrate and a color filter substrate, the plurality of gate lines Gate, the plurality of data lines Data, the common electrode Com with a low-level voltage, the plurality of pixel circuit units 10, and the plurality of photosensitive transistors T2 located on the array substrate. The color filter substrate comprises a plurality of color resists corresponding to the plurality of original translation pixel circuit units 10, and the plurality of color resists comprises red resists, green resists, and blue resists.

In the embodiment, each of the photosensitive transistors T2 is connected to the pixel circuit unit 10. When the photosensitive transistor T2 does not absorb external light, the photosensitive transistor is off, and the voltage applied to the vertically aligned (VA) liquid crystal is normal; at this time, the display picture is normal; when a user irradiates the display panel 100 provided in the embodiments with the laser pointer, in an area irradiated by the laser pointer, the photosensitive transistor T2 absorbs external light and turns on, the voltage of the pixel circuit unit 10 is pulled down to the low-level voltage of the common electrode Com, and there is no voltage differential applied to the VA liquid crystal; thus, the liquid crystal does not deflect, the light cannot pass through the liquid crystal, and the picture corresponding to the pixel circuit unit is black, while it displays normal color with the pixel circuit unit 10 not connected to the photosensitive transistor T2 in the area irradiated by the laser pointer, thus allowing displaying non-white color in the area irradiated by the laser pointer and projecting.

In detail, in the display panel 100 provided in the embodiment, each pixel circuit unit 10 comprises a thin film transistor T1, a capacitor C, a pixel electrode D and a node E.

A gate of the thin film transistor T1 is connected to the gate line Gate, a source of the thin film transistor T1 is connected to the node E, and a drain of the thin film transistor T1 is connected to the data line Data.

One end of the capacitor C is connected to the node E, and the other end of the capacitor C is connected to the common electrode Com.

The pixel electrode D is connected to the node E.

A gate and a source of the photosensitive transistor T2 are connected to the common electrode Com, and a drain of the photosensitive transistor T2 is connected to the node E, wherein the gate line Gate, the data line Data, the common electrode Com, the pixel circuit unit 10 and the photosensitive transistor T2 compose a photosensitive control circuit configured to pull down a voltage of the pixel circuit unit 10.

In an embodiment of the present disclosure, the photosensitive transistor T2 is an indium gallium zinc oxide transistor or a silicon transistor.

In an embodiment of the present disclosure, the pixel electrodes D comprise red pixel electrodes, green pixel electrodes, and blue pixel electrodes corresponding to the red resists, the green resists, and the blue resists respectively.

Figure 2:
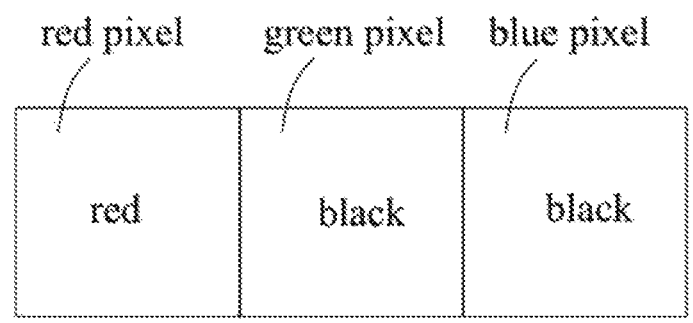
FIG. 2 is an effect chart showing a display panel irradiated by laser according to an embodiment of the present disclosure.

The photosensitive transistors T2 are connected to any two of groups of the red pixel electrodes, the green pixel electrodes, and the blue pixel electrodes respectively. In the embodiment, it is explained as an example that the photosensitive transistors T2 are connected to the green pixel electrode and the blue pixel electrode, which means there are two photosensitive transistors T2. One of the photosensitive transistors T2 is electrically connected to the green pixel electrode of one pixel circuit unit 10, and the other photosensitive transistor T2 is electrically connected to the blue pixel electrode of the other pixel circuit unit 10, not limited hereto. FIG. 2 is an effect chart showing a display panel irradiated by laser according to an embodiment of the present disclosure, illustrating that display pictures corresponding to the green pixel electrode and the blue pixel electrode are black, and display pictures corresponding to the red pixel electrode is red as normal. Therefore, a red point is projected on the screen during projection.

Of course, when the photosensitive transistors T2 are connected to the red pixel electrode and the green pixel electrode, a blue point is projected on the screen.

Further, in some embodiments, the photosensitive transistors are connected to any one of groups of the red pixel electrodes, the green pixel electrodes, and the blue pixel electrodes, which means that the photosensitive transistors are connected to only one kind of pixel electrodes selected from the groups of the red pixel electrodes, the green pixel electrodes, and the blue pixel electrodes. Thus, two colors are projected on the screen.

Theory of the embodiments is explained with an example that the photosensitive transistors are connected to the green pixel electrode and the blue pixel electrode as followed:

When a user irradiates the display panel 100 provided in the embodiments with a laser pointer, a red pixel, a green pixel and a blue pixel are disposed in an area irradiated by the laser pointer, and the photosensitive transistors T2 are disposed in the green pixel and the blue pixel.

Wherein the photosensitive transistor T2 absorbs external light and turns on, voltages applied to the green pixel electrode and the blue pixel electrode of the pixel circuit units 10 connected to the photosensitive transistors T2 are pulled down to the low-level voltage of the common electrode Com and there are no voltage differentials applied to the VA liquid crystal; thus, the liquid crystal does not deflect, the light cannot pass through the liquid crystal, and the non-display pictures corresponding to the green pixel and the blue pixel are black, while it displays normal color because the red pixel is not connected with the photosensitive transistor T2 in the area so that a voltage applied to the corresponding pixel circuit units 10 is not pulled down, thus allowing displaying non-white color in the area irradiated by the laser pointer and projecting.

An embodiment of the present disclosure provides a display device comprising a display panel, wherein the display panel comprises an array substrate, the array substrate comprises a plurality of gate lines and a plurality of data lines, and the array substrate further comprises a common electrode; a plurality of pixel circuit units, electrically connected to the plurality of gate lines, the plurality of data lines and the common electrode; and a plurality of photosensitive transistors, electrically connected to the plurality of pixel circuit units and the common electrode, wherein a voltage of the pixel circuit unit is pulled down to a voltage of the common electrode, when the photosensitive transistor is turned on by receiving external light.

In an embodiment of the present disclosure, each of the pixel circuit units comprises a thin film transistor, a capacitor, a pixel electrode and a node, wherein a gate of the thin film transistor is connected to the gate line, a source of the thin film transistor is connected to the node, and a drain of the thin film transistor is connected to the data line. One end of the capacitor is connected to the node, and the other end of the capacitor is connected to the common electrode. And the pixel electrode is connected to the node.

In a display device provided in an embodiment of the present disclosure, a gate and a source of the photosensitive transistor are connected to the common electrode, and a drain of the photosensitive transistor is connected to the node.

In a display device provided in an embodiment of the present disclosure, the pixel electrodes comprise red pixel electrodes, green pixel electrodes, and blue pixel electrodes corresponding to red resists, green resists, and blue resists respectively; wherein the original translation a photosensitive transistors are connected to any one of groups of the red pixel electrodes, the green pixel electrodes, and the blue pixel electrodes; or wherein the photosensitive transistors are connected to any two of groups of the red pixel electrodes, the green pixel electrodes, and the blue pixel electrodes respectively.

In a display device provided in an embodiment of the present disclosure, the display panel further comprises diodes. One end of each of the diodes is connected to the node and the other end of the diode is connected to the common electrode.

In contrast with the display panel in the prior art, in the display panel and the display device provided in the embodiments of the present disclosure, the photosensitive transistor is connected to the pixel circuit unit. When the photosensitive transistor does not absorb external light, the photosensitive transistor is off and the voltage applied to the vertically aligned (VA) liquid crystal is normal, at this time the display picture is normal; when a user irradiates the display panel provided in the embodiments with the laser pointer, in an area irradiated by the laser pointer, the photosensitive transistor absorbs external light and turns on, the voltage of the pixel circuit unit is pulled down to the low-level voltage of the common electrode and there is no voltage differential applied to the VA liquid crystal, and thus the liquid crystal does not deflect, the light cannot pass through the liquid crystal, and the picture corresponding to the pixel circuit unit is black, while it displays normal color with the pixel circuit unit not connected with the photosensitive transistor in the area irradiated by the laser pointer, thus allowing displaying non-white color in the area irradiated by the laser pointer and projecting. Thus the technical problem that a laser pointer cannot project when it projects to display with a liquid crystal display at present is solved.

Based on the description described above, those having ordinary skills of the art may make various changes and modifications of the technical solution and technical ideas of the present invention according to that of the present disclosure and all these changes and modifications are considered within the protection scope of the attached claims of the application.

What is claimed is:

1. A display panel comprising an array substrate and a color filter substrate, wherein the array substrate comprises a plurality of gate lines and a plurality of data lines, the color filter substrate comprises a plurality of color resists, and the array substrate further comprises:

a common electrode;

a plurality of pixel circuit units, electrically connected to the plurality of gate lines, the plurality of data lines, and the common electrode; and a plurality of photosensitive transistors, electrically connected to the plurality of pixel circuit units, and directly electrically connected to the common electrode;

wherein each of the photosensitive transistors is configured to turn on by receiving external light to pull down a voltage of each of the pixel circuit units to a voltage of the common electrode; and wherein each of the pixel circuit units comprises a thin film transistor, a gate of the thin film transistor is connected to the gate line, a source of the thin film transistor is connected to a drain of the photosensitive transistor, and a drain of the thin film transistor is connected to the data line.

2. The display panel as claimed in claim 1, wherein each of the pixel circuit units further comprises a capacitor, a pixel electrode, and a node;

wherein the source of the thin film transistor is connected to the node;

wherein one end of the capacitor is connected to the node, and another end of the capacitor is connected to the common electrode; and wherein the pixel electrode is connected to the node.

3. The display panel as claimed in claim 2, wherein a gate and a source of the photosensitive transistor are connected to the common electrode, and the drain of the photosensitive transistor is connected to the node.

4. The display panel as claimed in claim 2, wherein the pixel electrodes comprise red pixel electrodes, green pixel electrodes, and blue pixel electrodes corresponding to red resists, green resists, and blue resists respectively;

wherein the photosensitive transistors are connected to any one of groups of the red pixel electrodes, the green pixel electrodes, and the blue pixel electrodes; or wherein the photosensitive transistors are connected to any two of groups of the red pixel electrodes, the green pixel electrodes, and the blue pixel electrodes respectively.

5. The display panel as claimed in claim 3, wherein the photosensitive transistor is an indium gallium zinc oxide transistor or a silicon transistor.

6. A display panel comprising an array substrate, wherein the array substrate comprises a plurality of gate lines and a plurality of data lines, and the array substrate further comprises:

a common electrode;

a plurality of pixel circuit units, electrically connected to the plurality of gate lines, the plurality of data lines, and the common electrode; and a plurality of photosensitive transistors, electrically connected to the plurality of pixel circuit units, and directly electrically connected to the common electrode;

wherein each of the photosensitive transistors is configured to turn on by receiving external light to pull down a voltage of each of the pixel circuit units to a voltage of the common electrode; and wherein each of the pixel circuit units comprises a thin film transistor, a gate of the thin film transistor is connected to the gate line, a source of the thin film transistor is connected to a drain of the photosensitive transistor, and a drain of the thin film transistor is connected to the data line.

7. The display panel as claimed in claim 6, wherein each of the pixel circuit units further comprises a capacitor, a pixel electrode and a node;

wherein, the source of the thin film transistor is connected to the node;

wherein one end of the capacitor is connected to the node, and another end of the capacitor is connected to the common electrode; and wherein the pixel electrode is connected to the node.

8. The display panel as claimed in claim 7, wherein a gate and a source of the photosensitive transistor are connected to the common electrode, and the drain of the photosensitive transistor is connected to the node.

9. The display panel as claimed in claim 7, wherein the pixel electrodes comprise red pixel electrodes, green pixel electrodes, and blue pixel electrodes corresponding to red resists, green resists, and blue resists respectively;

wherein the photosensitive transistors are connected with any one of groups of the red pixel electrodes, the green pixel electrodes, and the blue pixel electrodes; or wherein the photosensitive transistors are connected to any two of groups of the red pixel electrodes, the green pixel electrodes, and the blue pixel electrodes respectively.

10. The display panel as claimed in claim 8, wherein the photosensitive transistor is an indium gallium zinc oxide transistor or a silicon transistor.

11. A display device comprising a display panel, wherein the display panel comprises an array substrate, the array substrate comprises a plurality of gate lines and a plurality of data lines, and the array substrate further comprises:

a common electrode;

a plurality of pixel circuit units, electrically connected to the plurality of gate lines, the plurality of data lines, and the common electrode; and a plurality of photosensitive transistors, electrically connected to the plurality of pixel circuit units, and directly electrically connected to the common electrode;

wherein each of the photosensitive transistors is configured to turn on by receiving external light to pull down a voltage of each of the pixel circuit units to a voltage of the common electrode; and wherein each of the pixel circuit units comprises a thin film transistor, a gate of the thin film transistor is connected to the gate line, a source of the thin film transistor is connected to a drain of the photosensitive transistor, and a drain of the thin film transistor is connected to the data line.

12. The display device as claimed in claim 11, wherein each of the pixel circuit units further comprises a capacitor, a pixel electrode, and a node;

wherein the source of the thin film transistor is connected to the node;

wherein one end of the capacitor is connected to the node, and another end of the capacitor is connected to the common electrode; and wherein the pixel electrode is connected to the node.

13. The display device as claimed in claim 12, wherein a gate and a source of the photosensitive transistor are connected to the common electrode, and the drain of the photosensitive transistor is connected to the node.

14. The display device as claimed in claim 12, wherein the pixel electrodes comprise red pixel electrodes, green pixel electrodes, and blue pixel electrodes corresponding to red resists, green resists, and blue resists respectively;

wherein the photosensitive transistors are connected to any one of groups of the red pixel electrodes, the green pixel electrodes, and the blue pixel electrodes; or wherein the photosensitive transistors are connected to any two of groups of the red pixel electrodes, the green pixel electrodes, and the blue pixel electrodes respectively.

15. The display device as claimed in claim 13, wherein the photosensitive transistor is an indium gallium zinc oxide transistor or a silicon transistor.

16. The display device as claimed in claim 1, wherein the photosensitive transistor is configured to turn off without absorbing external light to keep a high voltage applied to the vertically aligned liquid crystal to display a normal image, and wherein the photosensitive transistor is further configured to absorb external light and turn on to pull down the voltage of the pixel circuit unit to a low-level voltage of the common electrode to provide no voltage differential applied to the vertically aligned liquid crystal that the liquid crystal does not deflect, the light cannot pass through the liquid crystal, and an image corresponding to the pixel circuit unit is black.

* * * * *